(12) United States Patent
Forssell et al.

(10) Patent No.: US 6,364,046 B1
(45) Date of Patent: Apr. 2, 2002

(54) METHOD FOR ACTIVATION OF A SAFETY ARRANGEMENT IN A VEHICLE

(75) Inventors: Jonas Forssell, Göteborg; Christer Hjelmer, Alingsås; Jan Ivarsson, Billdal; Lotta Jakobsson, Gråbo; Åse Lund, Västra Frölunda; Mats Moberg, Billdal; Richard Nilsson, Mölndal; Emma Tivesten, Göteborg, all of (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 09/101,958

(22) PCT Filed: Jan. 30, 1997

(86) PCT No.: PCT/SE97/00143
   § 371 Date: Dec. 10, 1998
   § 102(e) Date: Dec. 10, 1998

(87) PCT Pub. No.: WO97/28029
   PCT Pub. Date: Aug. 7, 1997

(30) Foreign Application Priority Data

Jan. 30, 1996 (SE) ................................. 9600335
Jan. 30, 1996 (SE) ................................. 9600336

(51) Int. Cl.[7] .................................. B60T 13/70
(52) U.S. Cl. ................ 180/275; 180/282; 74/512; 303/20; 303/15
(58) Field of Search ................ 180/275, 274, 180/282; 74/512, 513, 514, 560, 561; 301/20, 15, 166, 122, 152, 122.03

(56) References Cited

U.S. PATENT DOCUMENTS

| | | | |
|---|---|---|---|
| 3,810,520 A | * 5/1974 | Iwata et al. | 180/275 |
| 3,945,672 A | * 3/1976 | Wong | 180/275 |
| 4,569,663 A | * 2/1986 | Miller et al. | 74/512 |
| 4,799,570 A | * 1/1989 | Andersson et al. | 180/275 |
| 4,964,485 A | * 10/1990 | Miele | 180/275 |
| 5,217,280 A | * 6/1993 | Nykerk et al. | 74/512 |
| 5,350,036 A | * 9/1994 | Shima | 180/273 |
| 5,563,355 A | * 10/1996 | Pluta et al. | 74/512 |
| 5,848,662 A | * 12/1998 | Sakaue | 180/274 |
| 5,937,707 A | * 8/1999 | Rixon et al. | 74/512 |
| 5,970,817 A | * 10/1999 | Ichiba | 74/512 |
| 5,983,746 A | * 11/1999 | Nawata et al. | 74/512 |
| 5,996,439 A | * 12/1999 | Elton et al. | 74/512 |

FOREIGN PATENT DOCUMENTS

| | | |
|---|---|---|
| DE | 2 135 151 A1 | 1/1973 |
| DE | 37 41 881 A1 | 7/1988 |
| DE | 44 09 285 A1 | 10/1994 |
| DE | 195 15 852 A1 | 11/1995 |

* cited by examiner

Primary Examiner—Lanna Mai
Assistant Examiner—Hau Phan
(74) Attorney, Agent, or Firm—Lerner, David, Littenberg, Krumholz & Mentlik, LLP

(57) ABSTRACT

Apparatus and methods are provided for the activation of a safety device associated with a vehicle pedal in a vehicle including an engine compartment, a pedal arm, a push rod connected to the pedal arm, and an acting rod for acting upon the push rod, the apparatus comprising an actuator for releasing the push rod from the pedal arm upon actuation thereof, and a sensor for actuation of the actuator in response to detection of a condition of the vehicle corresponding to a collison, the sensor being disposed in a zone within the vehicle defined by first and second distances displaced from the front edge of the vehicle, these distances being selected whereby the zone defines a location in which deformation occurs upon a collision at a predetermined speed and corresponding to minimum and maximum time delays for activation of the sensor after deformation of the vehicle.

19 Claims, 5 Drawing Sheets

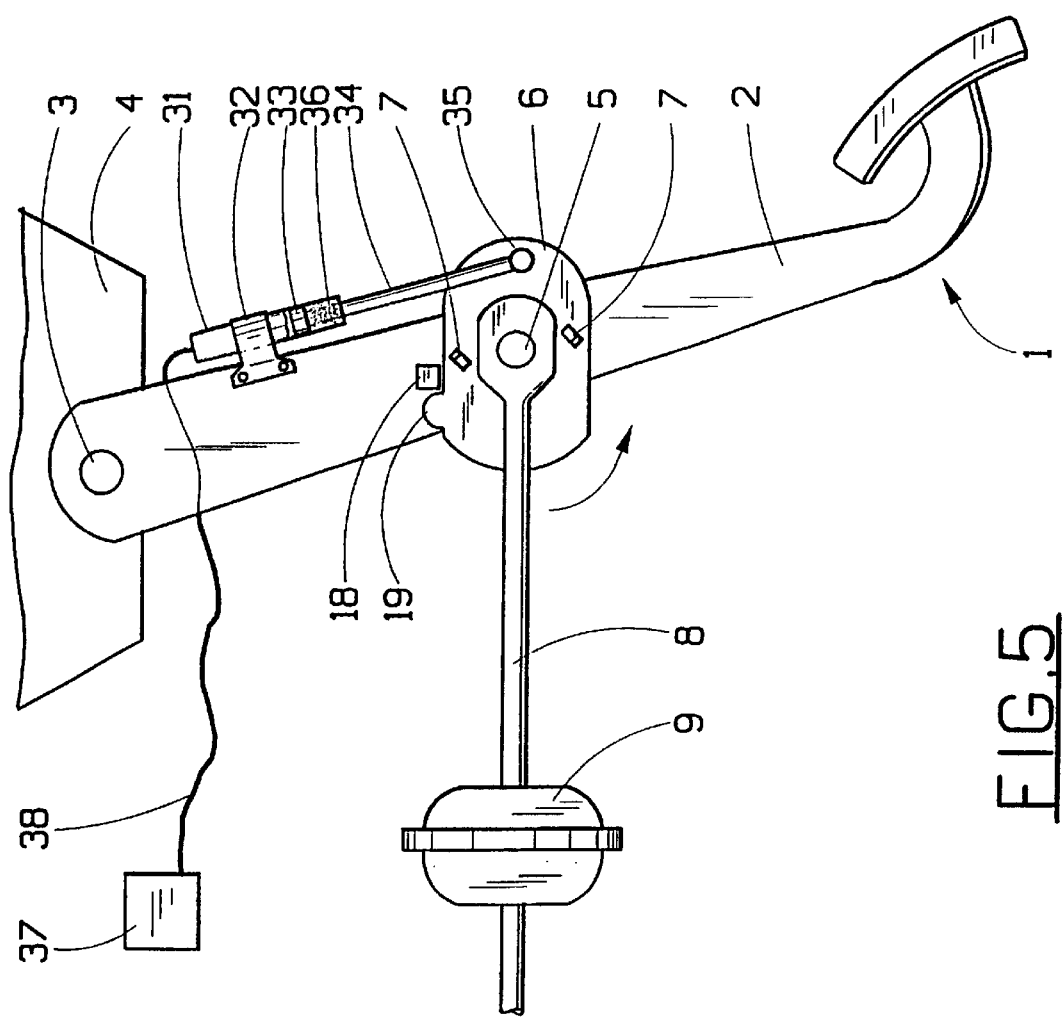
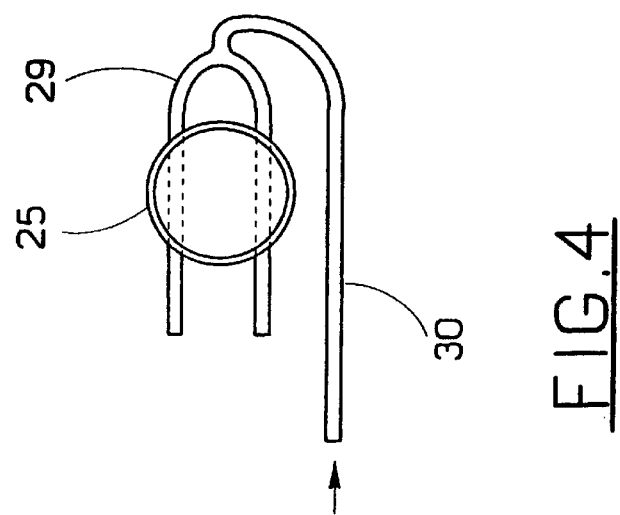
FIG.5
FIG.4

METHOD FOR ACTIVATION OF A SAFETY ARRANGEMENT IN A VEHICLE

SUMMARY OF THE INVENTION

The present invention relates to apparatus for activation of a safety device in a vehicle. More specifically, the present invention relates to a method for such activation. Still more particularly, the present invention can be applied in connection with activation of a safety device for brake pedals in motor vehicles.

BACKGROUND OF THE INVENTION

In the field of vehicles, such as passenger cars, it is common to use brake systems which comprise a brake pedal which is connected to a push rod, which in turn is connected to the servo mechanism of the brake system, i.e., the so-called brake booster. The brake booster is normally arranged in the rear part of the engine compartment of the vehicle.

In the event of a head-on collision, a deformation of the front part of the vehicle normally occurs. In some cases, this deformation can be so powerful that the front part is compressed, which causes the engine and other components in the engine compartment to be pressed against the brake booster with a high force. This causes the brake booster to exert a high force upon the push rod, which in turn causes the brake pedal to impart a short but intensive blow on the foot of the driver, before any deformation of the firewall takes place. In this manner, the pedal is caused to pivot into the passenger compartment of the vehicle in a direction towards the driver. This is a severe problem since the brake pedal might cause serious injuries to the feet and legs of the driver.

A known brake pedal arrangement which is intended to solve this problem is known from the Swedish Patent No. 465,769. This arrangement comprises a push rod which is pivotally arranged in the brake pedal arm and which is designed with a twisted part which can interact with side edges of the brake pedal arm. If the brake pedal arm (being, for example, affected by the brake booster in a collision) is thus pivoted more than a certain angle in relation to the push rod, the twisted part will affect the brake pedal arm so as to displace the push rod axially in a direction away from the pedal arm. In this manner, the push rod can be released from the brake pedal arm in the event of a collision.

Although this previously known arrangement functions satisfactorily in most types of collisions, there is a need to control release of the push rod from the brake pedal arm in a more active manner, for example so that it can be released even if the push rod has not been pivoted a predetermined angle in relation to the brake pedal arm. In this manner, release of the brake pedal from the push rod might take place at an earlier stage during a collision, which would provide improved protection against feet and leg injuries.

Another known arrangement of a similar kind is shown in European Patent No. 659,615. This arrangement comprises a pedal suspension with two arms, between which a pedal is pivotally suspended about a shaft. Each arm comprises a deformable part with a bearing in which the shaft is suspended. If the arrangement is affected by a predetermined force, the bearings will be detached from the shaft and the brake pedal is released. However, this arrangement implies a drawback in that it will not be activated until the drive train of the vehicle has begun to penetrate the firewall.

SUMMARY OF THE INVENTION

Consequently, an object of the present invention is to solve the above-mentioned problems and to provide an improved arrangement which is primarily intended for vehicles, and which provides for quick and effective release of a brake pedal from a push rod in the event of a collision. In particular, such release must take place before any part of the drive line of the vehicle has come into contact with the brake booster.

In accordance with the present invention, this and other objects have now been realized by the invention of apparatus for activation of a safety device associated with a vehicle pedal in a vehicle including a front edge, an engine compartment, a pedal arm, a push rod connected to the pedal arm, and acting means for acting upon the push rod, the apparatus comprising an actuator for releasing the push rod from the pedal arm upon actuation thereof, a sensor for actuation of the actuator in response to detection of a condition of the vehicle corresponding to a collision, the sensor being disposed in a predetermined zone within the vehicle, the predetermined zone being defined by a first distance proximate to the front edge of the vehicle and a second distance distal from the front edge of the vehicle, the first and second distances being selected whereby the predetermined zone defines a location in which deformation occurs upon a collision at at least a predetermined speed and corresponding to a time delay between a minimum time delay corresponding to the first distance and a maximum time delay corresponding to the second distance for activation of the sensor after such deformation.

In accordance with one embodiment, the vehicle includes at least one rigid body, and wherein at least one of the first and second distances is extended rearwardly in the vehicle by the intervening presence of the at least one rigid body.

In accordance with one embodiment of the apparatus of the present invention, the sensor comprises a hydraulic cylinder which mechanically detects the condition of the vehicle.

In accordance with another embodiment of the apparatus of the present invention, the sensor comprises a cable connected to the actuator, a spring member attached to the cable for biasing the cable into a first biased position in which the actuator is actuated, and a yoke element limiting movement of the cable towards the first biased position, whereby upon detection of said condition the yoke element is displaced from limiting the movement of the cable into the first biased position.

In accordance with another embodiment of the apparatus of the present invention, the apparatus includes a shaft extending from the pedal arm, the push rod including at least one opposed surface and being mounted on the shaft, the actuator comprising a pivoting member pivotally mounted on the pedal arm, the actuation of the actuator by the sensor comprising pivoting of the pivoting member, the pivoting member including at least one cam surface for interacting with the at least one opposed surface of the push rod upon pivoting of the pivoting member so as to dismount the push rod from the shaft. In a preferred embodiment, the pivoting member is pivotally mounted on the shaft, whereby the dismounting of the push rod from the shaft comprises axially displacing the push rod out of engagement with the shaft.

In accordance with another embodiment of the apparatus of the present invention, the at least one cam surface comprises a tongue-shaped member protruding substantially perpendicularly from the pivoting member.

In accordance with the present invention, a safety device is provided for association with a vehicle pedal in a vehicle comprising a console, a pedal arm pivotally mounted with respect to the console, a push rod connected between the pedal arm and a control device for the pedal arm including at least one opposed surface, a shaft extending from the pedal arm, the push rod being pivotally mounted on the shaft, the safety device comprising a pivoting member pivotally mounted on the pedal arm, the pivoting member including at least one cam surface for interacting with the at least one opposed surface of the push rod upon pivoting of the pivoting member so as to dismount the push rod from the shaft, and an actuator for pivoting the pivoting member before any part of the engine compartment effects the push rod during a collision.

In accordance with one embodiment, the pivoting member is pivotally mounted on the shaft, whereby the dismounting of the push rod from the shaft comprises axially displacing the push rod out of engagement with the shaft. In a preferred embodiment, the at least one cam surface comprises a tongue-shaped member protruding substantially perpendicularly from the pivoting member.

In accordance with one embodiment, the safety device of the present invention includes a sensor for actuation of the actuator in response to detection of a condition of the vehicle corresponding to a collision. In one embodiment, the actuator includes a first hydraulic cylinder connected to the pivoting member, whereby the sensor causes the pivoting member to pivot in a predetermined direction in response to detection of the condition. In a preferred embodiment, the sensor includes a second hydraulic cylinder connected to the first hydraulic cylinder for actuating the first hydraulic cylinder upon mechanical activation of the sensor.

In accordance with one embodiment of the safety device of the present invention, the sensor comprises a cable connected to the pivoting member whereby the cable is actuated by the detection of the condition by the sensor. In a preferred embodiment, the safety device includes a spring member attached to the cable for biasing the cable into a first biased position in which the actuator is actuated, and a yoke element limiting movement of the cable towards the first biased position, whereby upon detection of the position the yoke element is displaced from limiting the movement of the cable into the first biased position.

In accordance with one embodiment of the safety device of the present invention, the sensor comprises an acceleration sensor, and the safety device includes a pretensioning member connected to the pivoting member whereby the acceleration sensor causes the pretensioning member to pivot the pivoting member in a predetermined direction in response to detection of the condition.

In accordance with one embodiment of the safety device of the present invention, the least one cam surface obliquely extends from the plane of the pivoting member.

In accordance with the present invention, a vehicle is provided including the safety device wherein the sensor is mounted in a predetermined zone within the vehicle defined by a first distance proximate to the front edge of the vehicle and a second distance distal from the front edge of the vehicle, the first and second distances being selected whereby the predetermined zone defines a location in which deformation occurs upon a collision at at least a predetermined speed.

In accordance with the present invention, a method is provided for activation of a safety device associated with a vehicle pedal in a vehicle including a front edge, an engine compartment, a pedal arm, a push rod connected to the pedal arm and acting means for acting upon the push rod, the method comprising detecting a condition of the vehicle corresponding to a collision by means of a sensor, and releasing the push rod from the pedal arm in response to the detecting of the collision, the detecting of the collision including a time delay between the collision and the releasing of the push rod, the time delay being provided by disposing the sensor in a predetermined zone within the vehicle, the predetermined zone being defined by a first distance proximate to the front edge of the vehicle and a second distance distal from the front edge of the vehicle, the first and second distances being selected whereby the predetermined zone defines a location in which deformation occurs upon a collision at at least a predetermined speed and corresponds to the time delay being between a minimum time delay corresponding to the first distance and a maximum time delay corresponding to the second distance.

According to the present invention, a method is provided for activation of a safety device associated with a vehicle comprising a console, a pedal arm pivotally mounted with respect to the console, a push rod connected between the pedal arm and a control device for the pedal arm including at least one opposed surface, a shaft extending from the pedal arm, the push rod being pivotally mounted on the shaft, the method comprising pivoting a pivoting member mounted on the pedal arm, the pivoting member including at least one cam surface for interacting with the at least one opposing surface of the push rod upon pivoting the pivoting member, and guiding the cam surface so as to dismount the push rod from the shaft before any part of the engine compartment effects the push rod during a collision.

The apparatus according to the present invention comprises actuation means for releasing the push rod from the pedal arm and a sensor for activation of the actuation means in case of detection of a condition generally corresponding to a collision. In accordance with the present invention, the sensor device and the actuation means are arranged to release the push rod from the pedal arm before any part of the engine of the vehicle or any other part in the engine compartment acts upon the push rod. In this way, a quick and effective release of the push rod from the brake pedal arm in the event of a collision is obtained.

Furthermore, according to the present invention, a pedal arrangement comprising a pedal arm with a shaft and a particular pivoting element are provided. The pivoting element is pivotally arranged on the pedal arm and also comprises at least one cam surface which can cooperate with the push rod. The invention further comprises actuatable means, by means of which the pivoting element can be forced to pivot so that the cam surface of the pivoting element causes the push rod to be displaced out of engagement with the shaft.

In this manner, the push rod can be released from, the pedal arm before any part of the engine of the vehicle or any other part in the engine compartment can act upon the push rod, which provides quick and effective releasing of the push rod from the brake pedal arm should a collision occur.

According to a particular embodiment, the present invention comprises a sensor device which is arranged to activate the pivoting element to be pivoted about the shaft. According to this embodiment, the sensor device comprises a hydraulic cylinder which can affect another hydraulic cylinder so that the latter one pivots the pivoting element about the shaft. According to yet another embodiment, the sensor device comprises a wire which is biased by means of a spring. This spring can be released so that the wire causes the pivoting element to pivot, by means of the force of the spring.

BRIEF DESCRIPTION OF THE FIGURES

The invention will be described in the following detailed description in greater detail with reference to the appended drawings, in which

FIG. 4 is a side, elevational view of a sensor arrangement which can be used in the embodiment of the present invention shown in FIG. 3;

FIG. 5 is a side, elevational, partially schematic view of a pedal arrangement according to a further embodiment of the present invention.

DETAILED DESCRIPTION

Figure 1:
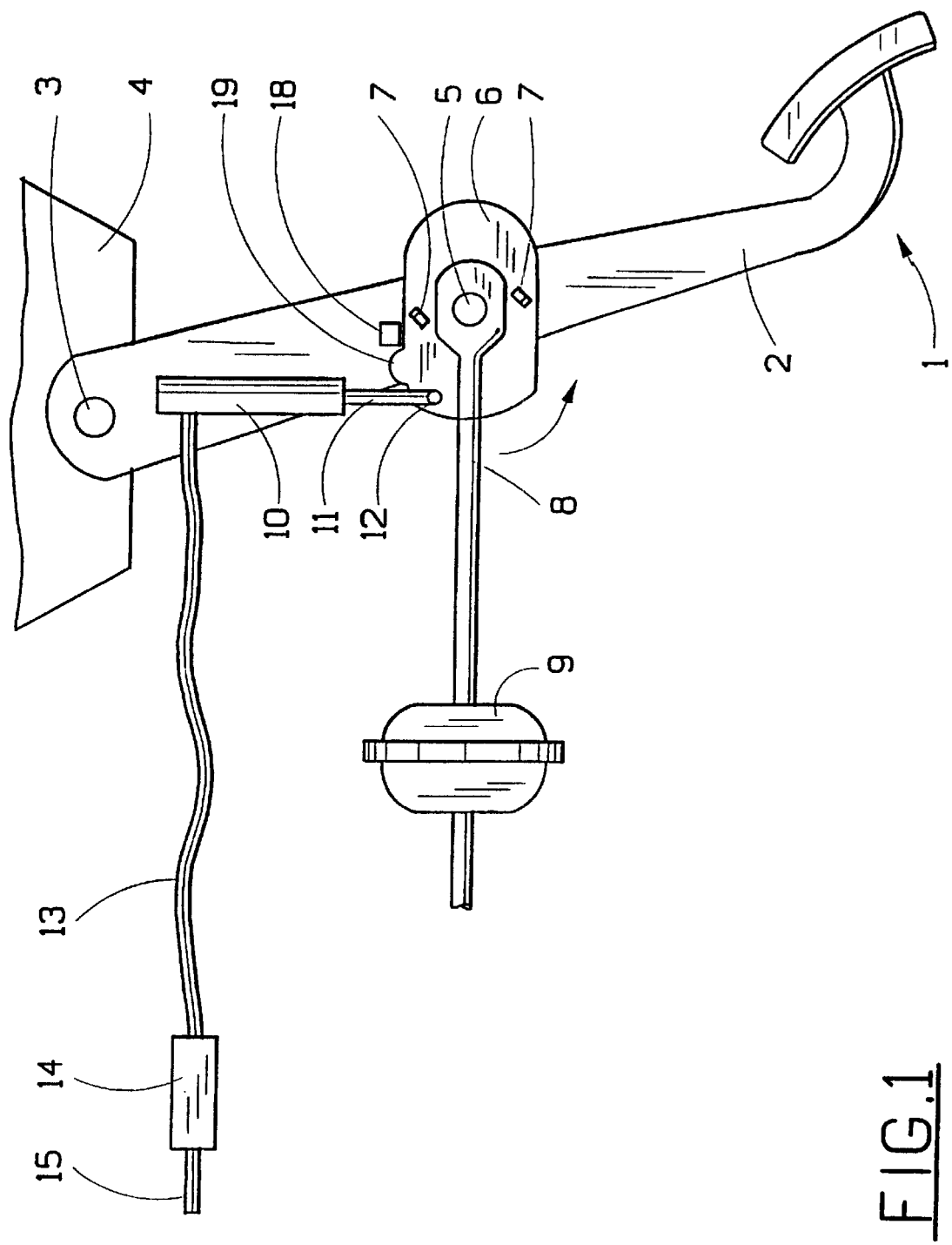
FIG. 1 is a side, elevational, partially schematic view of a pedal arrangement according to a first embodiment of the present invention.

Referring to the Drawings, FIG. 1 shows a schematic side view of a pedal arrangement which can be used in the present invention. The pedal arrangement comprises a brake pedal 1 with a brake pedal arm which is pivotally arranged about a shaft 3 in a console 4. In a manner which is conventional, the console 4 is arranged on the underside of a dashboard (not shown) of a vehicle such as a passenger car.

The pedal arm 2 comprises an aperture which supports a further shaft 5. A pivotable element in the form of a plate 6 is pivotally arranged on the shaft 5 and comprises at least one, and preferably two, tongues 7 which protrude in an essentially perpendicular direction from the plate 6, and which are slightly oblique in relation to the horizontal plane. The design and function of the tongues 7 will be described in detail below. On the outside of the plate 6, a push rod 8 is pivotally arranged on the shaft 5. The push rod 8, which preferably is made from flat iron, is connected to the brake system of the vehicle, to be more precise to its brake booster 9. The other parts of the brake system are conventional and for this reason they will not be described in detail. The push rod 8 and the plate 6 are held in place in the normal condition, as shown in FIG. 1, by means of a locking washer (not shown) or the like, which is arranged at the outermost position on the shaft 5.

Furthermore, a first cylinder 10 is arranged on the pedal arm 2. The first cylinder 10 is preferably of the hydraulic kind and comprises a piston (not shown) and a rod 11 which can be affected so as to protrude out of the cylinder 10 if hydraulic liquid under pressure exists in the cylinder 10. The rod 11 is pivotally attached to an attachment point 12 in the plate 6.

A conduit 13 for hydraulic fluid is arranged between the first cylinder 10 and a second cylinder 14. According to this embodiment, the second cylinder 14 is arranged to function as a collision sensor. To this end, it is arranged in the front part of the vehicle. The second cylinder 14 comprises a rod 15 which, when depressed, affects a piston (not shown) so as to force hydraulic liquid in the direction towards the conduit 14 and the first cylinder 10.

The second cylinder 14 is arranged in the vehicle in such a way that deformation of the vehicle in the event of a head-on collision will cause the rod 15 to be depressed. In this manner, hydraulic liquid is fed through the conduit 13 and into the first cylinder 10. This causes the rod 11 of the first cylinder 10 to protrude a certain distance. In turn, this causes the plate 6 to pivot a certain angle in the counter-clockwise direction, i.e., in the direction indicated with an arrow in FIG. 1. The arrangement of the second cylinder 14 in a vehicle will be described in detail below.

Figure 2:
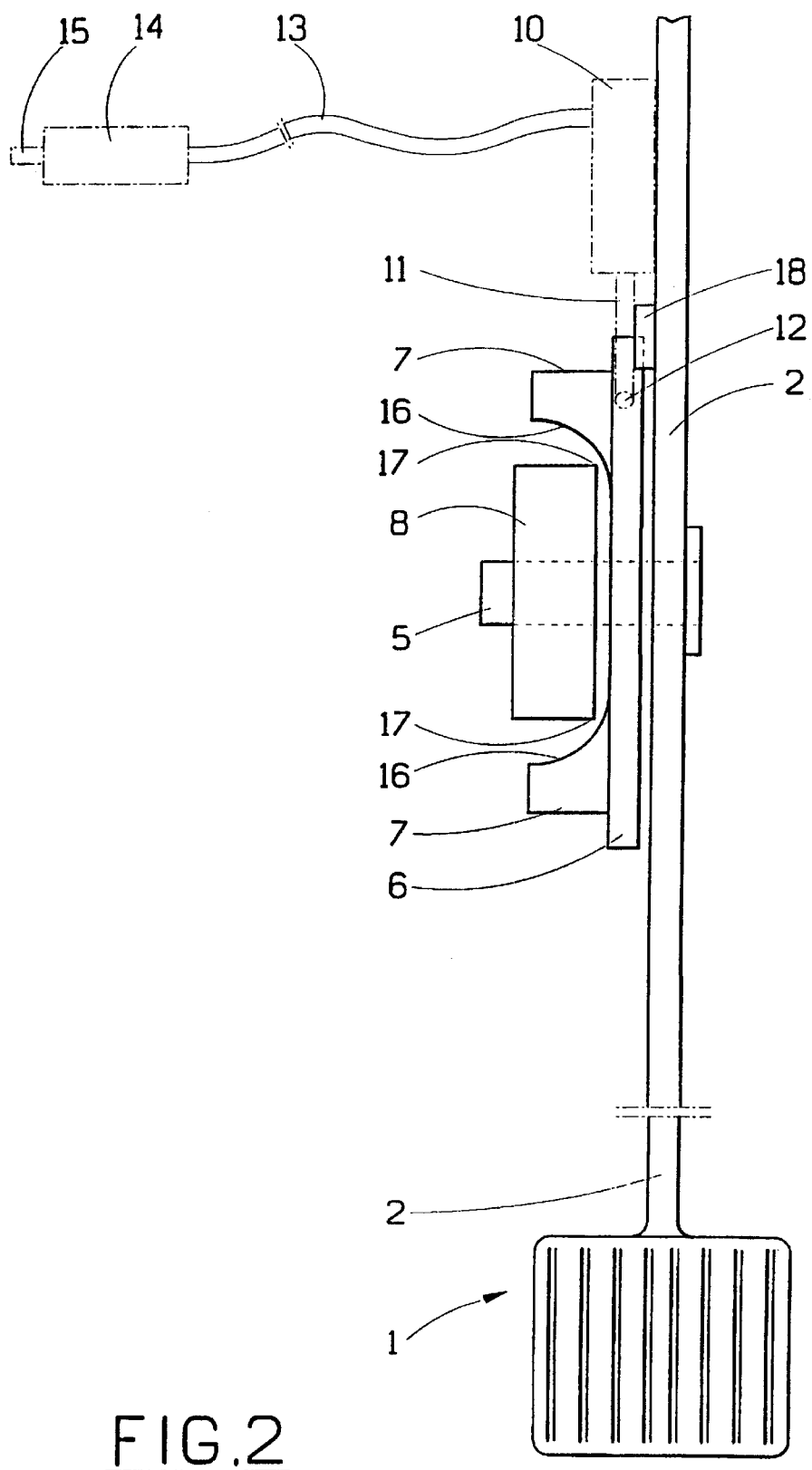
FIG. 2 is a front, elevational, partially enlarged view of the embodiment shown in FIG. 1.

With reference to FIG. 2 in which the shaft 5, the plate 6, the tongues 7, and the push rod 8 are shown slightly enlarged for reasons of clarity, it will now be realized that when the plate 6 is pivoted as has been described above, the tongues 7 will come into contact with the push rod 8. In this way, the tongues 7 will cause the push rod 8 to be displaced in an axial direction away from the plate 6, i.e. to the left as shown in FIG. 2. In order for the tongues 7 to be able to push the push rod 8 in an axial direction, the tongues are arranged so that they protrude in a mainly perpendicular direction from the plate 6, i.e., in the direction of the push rod 8. Furthermore, each of the tongues has an edge 16 which is rounded, oblique, or shaped in a corresponding manner, which edge will come into contact with the push rod 8, preferably with the corner edges 17 thereof, when the plate is pivoted as described above. When the push rod 8 has been displaced far enough axially to the left, it will fall off the shaft 5. In this manner, the push rod 8 is released from the pedal arm 2.

As will be described in detail below, the second cylinder 14 is arranged in such a manner in the vehicle that it will be affected by a deformation of the front part of the vehicle at an optimally chosen point in time during a collision. In particular, the first cylinder 10 can be activated so that the push rod 8 is released from the brake pedal arm 2 at such an early stage of a collision that the push rod 8 does not transfer any force to the brake pedal.

With reference to FIGS. 1 and 2, it can be seen that the brake pedal arm 2 is provided with a protrusion 18 which protrudes from the brake pedal 2 and serves as a stop which interacts with a protruding part 19 of the plate 6. In this way, the plate 6 is prevented from pivoting too far in the clockwise direction (see FIG. 1).

Figure 3:
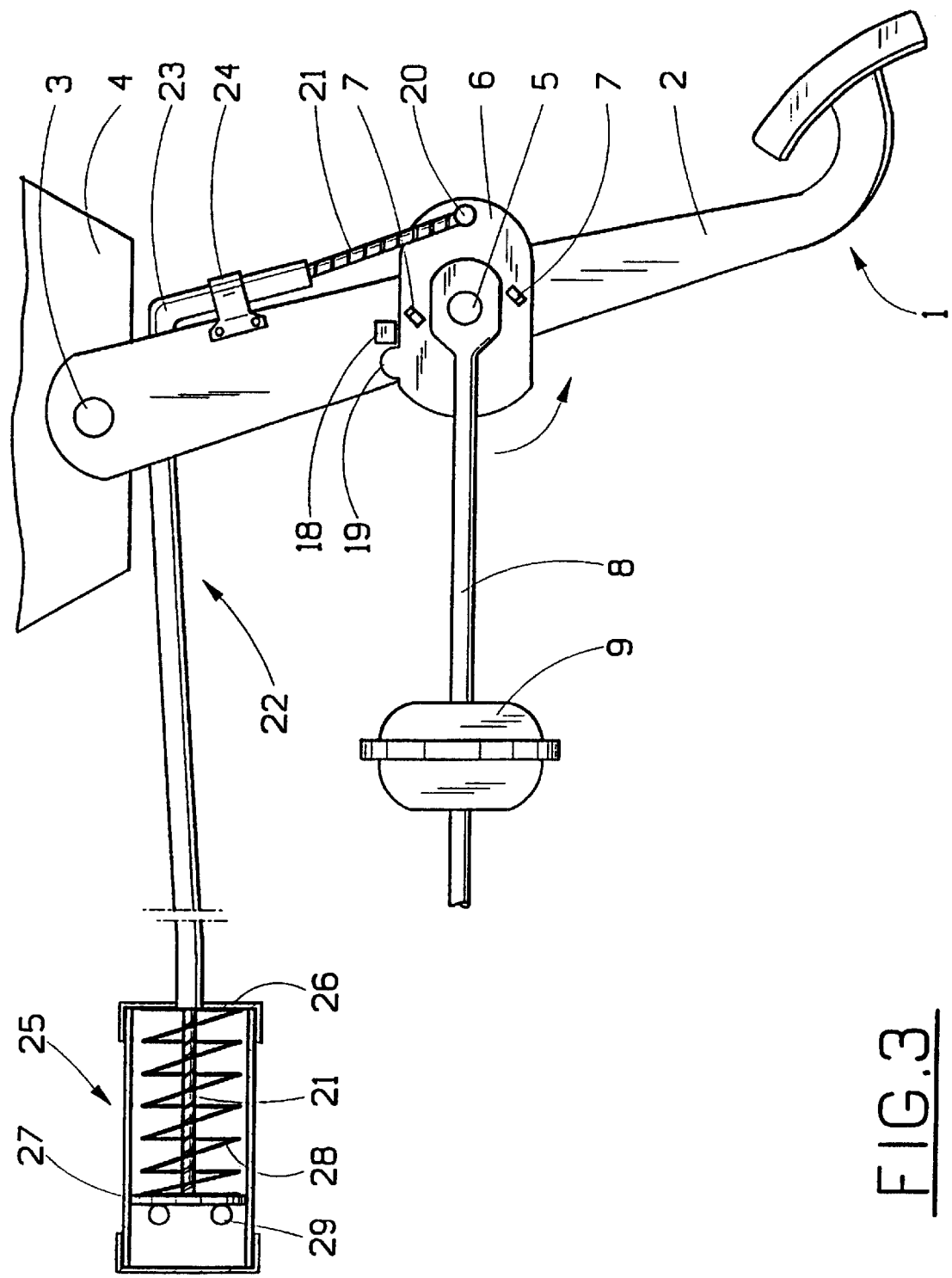
FIG. 3 is a side, elevational, partially schematic view of a pedal arrangement according to a second embodiment of the present invention.

FIG. 3 is a schematic side view of a pedal arrangement according to a second embodiment. The parts which correspond to those shown in FIGS. 1 and 2 are denoted with the same reference numerals in FIG. 3. The main difference between the two embodiments is that the embodiment shown in FIG. 3 employs a mechanical power transmission for pivoting the plate 6, whereas the embodiment shown in FIGS. 1 and 2 utilizes a hydraulic power transmission for pivoting the plate 6.

According to the embodiment shown in FIG. 3, the plate 6 is provided with an attachment 20 in which a wire 21 is arranged. The wire 21 comprises the inner cable of a mechanical cable 22, the outer sheath 23 of which is fixed to the brake pedal arm 2 by means of a clamp 24 or the like. Furthermore, the cable 22 is connected to a sensor device 25 which is preferably accommodated in a cylindrically shaped body. The outer sheath 23 of the cable 22 is fixed on one of the end walls of the sensor device 25, i.e., the end wall 26, whereas the inner wire 21 extends into the sensor device 25. Furthermore, the inner wire 21 is fixed to a holding plate 27 which can be displaced longitudinally in the sensor device 25. Between the holding plate 27 and the end surface 26, a spring 28 is arranged, which spring is biased so that it acts upon the inner wire 21 in a direction inwards into the sensor device 25, i.e., to the left in FIG. 3. The holding plate 27 is held in place by means of a yoke 29 which preferably is U-shaped and the legs of which extend through the wall of the sensor device 25. In its assembled condition, the yoke 29 prevents the holding plate 27 from being displaced to the left, i.e., the yoke 29 acts to maintain the spring 28 in its biased state.

The sensor device 25 is shown in an end view in FIG. 4, in which the position of the yoke 29 can be seen more clearly.

According to this embodiment, the yoke 29 is arranged so that it can be pushed out of the sensor device 25 in the event of a collision. To this end, the yoke 29 is preferably connected to a bar 30 which is arranged such that, when affected in the direction indicated by means of an arrow in FIG. 4, it will cause the yoke 29 to be displaced out of the sensor device 25.

The bar 30 is preferably arranged at a position in the front part of the vehicle, so that in the event of a collision, i.e., a deformation of the front part, it will be displaced longitudinally. This causes the yoke 29 to be brought out of engagement with the sensor device 25.

FIG. 5 shows a further embodiment of the present invention, which comprises a pretensioning device 31 of the kind which is normally used to tighten a seat belt in the event of a collision. The pretensioning device 31 is fixed on the brake pedal arm 2 by means of a clamp 32 or the like.

Inside the pretensioning device 31, a piston 33 is arranged, which piston is connected to a bar 34 or a wire, depending on the type of assembly. In the first case, the bar 34 is, in turn, connected to the plate 6 by means of an attachment 35. Furthermore, inside the pretensioning device 31 a powder charge 36 is arranged, which charge can be ignited by means of a triggering device (not shown). In this case, the piston 33 will be caused to move upwards, thereby pulling the bar 34 upwards. This causes the plate 6 to rotate a certain amount in the counter-clockwise direction, thereby releasing the push bar 8 from the shaft 5, as has been described above.

The pretensioning device 31 is connected to a sensor device 37 by means of a connector 38. The sensor device 37 is preferably of a type which is used as an acceleration sensor which detects severe braking of the vehicle. Preferably, the invention uses the same kind of sensor which is utilized to trigger an airbag used in vehicles to protect the occupants. The sensor device 37 is preferably arranged inside the passenger compartment of the vehicle, for example in connection with the vehicle's gear lever.

Figure 6:
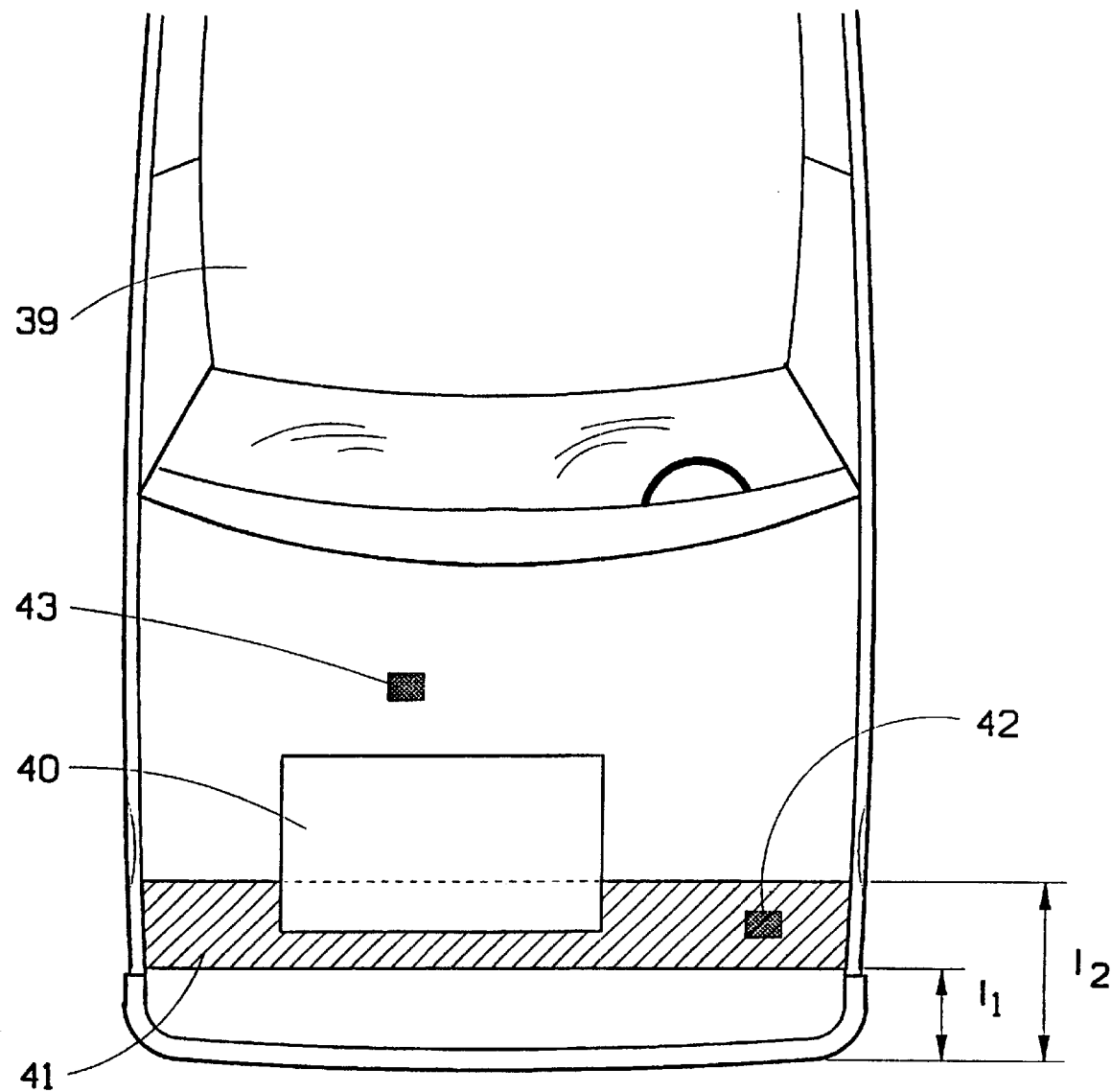
FIG. 6 is a top, elevational, partial view of a vehicle, illustrating the function of the present invention.

FIG. 6 shows a simplified top view of a vehicle 39 in which the present invention can be used. The drawing shows an intended position for the engine 40 of the vehicle 39 and a zone 41 in the vehicle 39 within which the sensor device, being arranged to activate the release of the push bar from the brake pedal arm, can be arranged. The term "sensor device" refers to the second cylinder 14 with its corresponding rod 15 (according to the embodiment shown in FIGS. 1 and 2) or the sensor device 25 with its yoke 29 (in the embodiment shown in FIGS. 3 and 4). The sensor device 37 according to FIG. 5 can be placed anywhere in the vehicle since it is an acceleration sensor.

As regards the position of the zone 41, it starts at a certain distance $1_1$ as seen from the front bumper of the vehicle 39. This means that there will be a certain "delay" as regards the activation of the sensor device, i.e., from the instant that a collision takes place. This delay, which in the event of a collision corresponds to the time it takes until the deformation of the front part of the vehicle reaches the sensor, is normally approximately 20–40 ms, preferably approximately 30 ms. This corresponds to a distance $1_1$ from the front edge of the vehicle 39 of approximately 30 cm. In a corresponding manner, the release of the brake pedal arm from the push rod must not take place too late. For this reason, the zone 41 is limited in the longitudinal direction of the vehicle 39 by a certain distance $1_2$ from the front edge of the vehicle 39, which distance $1_2$ is approximately 45 cm. Obviously, these distances, $1_1$ and $1_2$, can vary according to the size of the vehicle and the engine compartment—the example refers to a large family car.

A preferred position for a sensor device is shown with reference numeral 42 in FIG. 6. A further possible position for the sensor device is shown with reference numeral 43. The latter position is possible since the engine 40 then will constitute a rigid body, by means of which the zone 41 is extended in the longitudinal direction of the vehicle 39. In this manner, the zone 41 can provide an effective extension a certain distance behind the engine 40. Other rigid bodies in the engine compartment of the vehicle 39 which are positioned in front of the sensor device also function so as to "extend" the limitation of the zone 41.

Furthermore, the vehicle 39 should preferably be traveling with a predetermined minimum collision speed in order to allow the release of the brake pedal from the push bar. This speed is preferably 15 mph (24 km/h). This means that the sensor device and the vehicle must be arranged so that collisions at lower speeds than the above-mentioned limit will cause a deformation which does not reach the sensor device so that it triggers the release of the brake pedal arm.

The present invention is not limited to the described embodiments, but may be varied within the scope of the appended claims. For example, the edges 16 of the tongues 7 can be shaped in different ways, and can be curve-shaped, alternatively be slightly or highly oblique in relation to the plane of the plate 6.

It should also be noted that although the present invention has been described in connection with a brake pedal, it can also be utilized in other kinds of pedals.

Furthermore, the sensor device which is used (i.e., the second cylinder 13 or the sensor device 25) is preferably positioned so as to be triggered both in the event of a head-on collision and in the event of a so called "offset" collision, i.e., a collision where a vehicle collides so that its front part is somewhat displaced sideways in relation to its position in a head-on collision. In order for the sensor device to trigger in the event of an offset collision, it is normally necessary to position it at one of the front edges of the vehicle.

The first cylinder 10 (see FIG. 1) can be arranged either on the brake pedal arm 2 or on the shaft 3 about which the brake pedal arm 2 can be pivoted.

The above-mentioned pedal arrangements shown in FIGS. 1–5, which comprise means to release the push bar 8 from the pedal arm 2, are only examples of such arrangements. Other similar pedal arrangements are possible within the scope of the present invention, for example an electrical solution where a solenoid is activated by a sensor and pushes the push rod away so as to release it from the pedal arm, or a pyrotechnical solution according to the SIPS principle, wherein an ignition device in the engine compartment, for example in front of the wheelhousing on the driver's side, triggers a pretensioning device via a fuse, so that the pretensioning device releases the push bar.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for activation of a safety device associated with a vehicle pedal in a vehicle including a front edge, an engine compartment, a pedal arm, a push rod connected to said pedal arm, and acting means for acting upon said push rod, said apparatus comprising an actuator for releasing said push rod from said pedal arm upon actuation thereof, a sensor for actuation of said actuator in response to detection of a condition of said vehicle corresponding to a collision, said sensor being disposed in a predetermined zone within said vehicle, said predetermined zone being defined by a first distance proximate to said front edge of said vehicle and a second distance distal from said front edge of said vehicle, said first and second distances being selected whereby said predetermined zone defines a location in which deformation occurs upon a collision at at least a predetermined speed and corresponding to a time delay between a minimum time delay corresponding to said first distance and a maximum time delay corresponding to said second distance for activation of said sensor after said deformation.

2. The apparatus of claim 1 wherein said vehicle includes at least one rigid body, and wherein at least one of said first and second distances is extended rearwardly in said vehicle by the intervening presence of said at least one rigid body.

3. The apparatus of claim 1 wherein said sensor comprises a hydraulic cylinder which mechanically detects said condition of said vehicle.

4. The apparatus of claim 1 wherein said sensor comprises a cable connected to said actuator, a spring member attached to said cable for biasing said cable into a first biased position in which said actuator is actuated, and a yoke element limiting movement of said cable towards said first biased position, whereby upon detection of said condition said yoke element is displaced from limiting said movement of said cable into said first biased position.

5. The apparatus of claim 1 including a shaft extending from said pedal arm, said push rod including at least one opposed surface and being mounted on said shaft, said actuator comprising a pivoting member pivotally mounted on said pedal arm, said actuation of said actuator by said sensor comprising pivoting of said pivoting member, said pivoting member including at least one cam surface for interacting with said at least one opposed surface of said push rod upon pivoting of said pivoting member so as to dismount said push rod from said shaft.

6. The apparatus of claim 5 wherein said pivoting member is pivotally mounted on said shaft, whereby said dismounting of said push rod from said shaft comprises axially displacing said push rod out of engagement with said shaft.

7. The apparatus of claim 5 wherein said at least one cam surface comprises a tongue-shaped member protruding substantially perpendicularly from said pivoting member.

8. A safety device for association with a vehicle pedal in a vehicle comprising a console, a pedal arm pivotally mounted with respect to said console, a push rod connected between said pedal arm and a control device for said pedal arm including at least one opposed surface, a shaft extending from said pedal arm, said push rod being pivotally mounted on said shaft, said safety device comprising a pivoting member pivotally mounted on said pedal arm, said pivoting member including at least one cam surface for interacting with said at least one opposed surface of said push rod upon pivoting of said pivoting member so as to dismount said push rod from said shaft, and an actuator for pivoting said pivoting member before any part of said engine compartment effects said push rod during a collision.

9. The safety device of claim 8 wherein said pivoting member is pivotally mounted on said shaft, whereby said dismounting of said push rod from said shaft comprises axially displacing said push rod out of engagement with said shaft.

10. The safety device of claim 9 wherein said at least one cam surface comprises a tongue-shaped member protruding substantially perpendicularly from said pivoting member.

11. The safety device of claim 8 including a sensor for actuation of said actuator in response to detection of a condition of said vehicle corresponding to said collision.

12. The safety device of claim 11 wherein said actuator includes a first hydraulic cylinder connected to said pivoting member, whereby said sensor causes said pivoting member to pivot in a predetermined direction in response to said detection of said condition.

13. The safety device of claim 12 wherein said sensor includes a second hydraulic cylinder connected to said first hydraulic cylinder for actuating said first hydraulic cylinder upon mechanical activation of said sensor.

14. The safety device of claim 11 wherein said sensor comprises a cable connected to said pivoting member whereby said cable is actuated by said detection of said condition by said sensor.

15. The safety device of claim 14 including a spring member attached to said cable for biasing said cable into a first biased position in which said actuator is actuated, and a yoke element limiting movement of said cable towards said first biased position, whereby upon detection of said position said yoke element is displaced from limiting said movement of said cable into said first biased position.

16. The safety device of claim 8 wherein said at least one cam surface obliquely extends from the plane of said pivoting member.

17. A vehicle including the safety device of claim 11 wherein said sensor is mounted in a predetermined zone within said vehicle defined by a first distance proximate to said front edge of said vehicle and a second distance distal from said front edge of said vehicle, said first and second distances being selected whereby said predetermined zone defines a location in which deformation occurs upon a collision at at least a predetermined speed.

18. A method for activation of a safety device associated with a vehicle pedal in a vehicle including a front edge, an engine compartment, a pedal arm, a push rod connected to said pedal arm and acting means for acting upon said push rod, said method comprising detecting a condition of said vehicle corresponding to a collision by means of a sensor, and releasing said push rod from said pedal arm in response to said detecting of said condition, said detecting of said condition including a time delay between said collision and said releasing of said push rod, said time delay being provided by disposing said sensor in a predetermined zone within said vehicle, said predetermined zone being defined by a first distance proximate to said front edge of said vehicle and a second distance distal from said front edge of said vehicle, said first and second distances being selected whereby said predetermined zone defines a location in which deformation occurs upon a collision at at least a predetermined speed and corresponds to said time delay being between a minimum time delay corresponding to said first distance and a maximum time delay corresponding to said second distance.

19. A method for activation of a safety device associated with a vehicle comprising a console, a pedal arm pivotally mounted with respect to said console, a push rod connected between said pedal arm and a control device for said pedal arm including at least one opposed surface, a shaft extending from said pedal arm, said push rod being pivotally mounted on said shaft, said method comprising pivoting a pivoting member mounted on said pedal arm, said pivoting member including at least one cam surface for interacting with said at least one opposing surface of said push rod upon pivoting said pivoting member, and guiding said cam surface so as to dismount said push rod from said shaft before any part of said engine compartment effects said push rod during a collision.

* * * * *